(12) United States Patent
Peace et al.

(10) Patent No.: US 11,248,535 B2
(45) Date of Patent: Feb. 15, 2022

(54) GAS TURBINE ENGINE WITH COMPRESSOR BLEED VALVE INCLUDING AT LEAST TWO OPEN POSITIONS

(71) Applicant: ROLLS-ROYCE plc, London (GB)

(72) Inventors: Richard Peace, Derby (GB); Robert Goulds, Derby (GB)

(73) Assignee: ROLLS-ROYCE plc, London (GB)

( * ) Notice: Subject to any disclaimer, the term of this patent is extended or adjusted under 35 U.S.C. 154(b) by 267 days.

(21) Appl. No.: 16/401,225

(22) Filed: May 2, 2019

(65) Prior Publication Data

US 2020/0291866 A1   Sep. 17, 2020

(30) Foreign Application Priority Data

May 31, 2018 (GB) ...................................... 1808852

(51) Int. Cl.
*F02C 9/18* (2006.01)
*F02C 7/36* (2006.01)
(Continued)

(52) U.S. Cl.
CPC .................. *F02C 9/18* (2013.01); *F02C 6/08* (2013.01); *F02C 7/36* (2013.01); *F02K 3/02* (2013.01); *F04D 27/0215* (2013.01); *F02K 3/06* (2013.01); *F05D 2270/64* (2013.01); *F16K 15/038* (2013.01)

(58) Field of Classification Search
CPC ...... F02C 6/08; F02C 9/18; F02C 7/06; F02K 3/02; F02K 3/06; F02K 3/105; F16K 21/12; F05D 2270/64; F05D 2270/10; F05D 2270/101
See application file for complete search history.

(56) References Cited

U.S. PATENT DOCUMENTS 2,703,477 A * 3/1955 Anxionnaz ............... F02C 9/18
60/262
2,837,270 A    6/1958 Chapman
(Continued)

FOREIGN PATENT DOCUMENTS

EP     1854989 A2   11/2007
EP     2431591 A2    3/2012
(Continued)

OTHER PUBLICATIONS

Nov. 13, 2018 Search Report issued in British Patent Application No. 1808853.4.
(Continued)

*Primary Examiner* — Alain Chau
(74) *Attorney, Agent, or Firm* — Oliff PLC (57) ABSTRACT

A gas turbine engine comprising: a compressor; a first turbine; and a first compressor bleed valve in fluid communication with the compressor and configured to release bleed air from the compressor; wherein the first compressor bleed valve is configured to release bleed air to a downstream location in the engine, the downstream location being downstream of the first turbine; wherein the first compressor bleed valve is configured to open wherein the first compressor bleed valve is configured to open to at least two positions, to thereby release a variable amount of bleed air from the compressor.

16 Claims, 5 Drawing Sheets

(51) Int. Cl.
*F04D 27/02* (2006.01)
*F02K 3/02* (2006.01)
*F02C 6/08* (2006.01)
*F02K 3/06* (2006.01)
*F16K 15/03* (2006.01)

(56) References Cited

U.S. PATENT DOCUMENTS

| | | | | |
|---|---|---|---|---|
| 4,813,229 A * | 3/1989 | Simmons | | F02C 7/18 60/204 |
| 4,961,312 A * | 10/1990 | Simmons | | F02C 7/18 60/204 |
| 5,182,905 A * | 2/1993 | Stransky | | F02C 9/18 60/204 |
| 5,261,228 A * | 11/1993 | Shuba | | F01D 17/105 60/226.3 |
| 5,594,665 A * | 1/1997 | Walter | | F04D 27/001 700/301 |
| 6,112,513 A * | 9/2000 | Catt | | F02K 1/30 239/265.17 |
| 6,679,048 B1 * | 1/2004 | Lee | | F02K 1/002 239/265.23 |
| 8,015,826 B2 * | 9/2011 | Myers | | F02C 9/18 60/785 |
| 8,453,462 B2 * | 6/2013 | Wichmann | | F02C 3/34 60/773 |
| 8,511,095 B2 * | 8/2013 | Mullender | | F01D 17/105 60/785 |
| 8,591,173 B2 * | 11/2013 | Bouru | | F02C 9/22 415/36 |
| 8,661,832 B2 * | 3/2014 | Griffin | | F04D 27/0223 60/779 |
| 8,740,547 B2 * | 6/2014 | Colotte | | F02C 6/08 415/36 |
| 8,915,085 B2 * | 12/2014 | Balandier | | F02K 3/075 60/751 |
| 8,925,330 B2 * | 1/2015 | Britchford | | F02C 6/08 60/785 |
| 8,931,284 B2 * | 1/2015 | Hussain | | F02C 9/18 60/785 |
| 9,982,598 B2 * | 5/2018 | Pritchard, Jr. | | F02C 9/18 |
| 10,113,484 B2 * | 10/2018 | Glessner | | F02C 6/08 |
| 10,174,681 B2 * | 1/2019 | Beecroft | | F02C 9/18 |
| 10,208,676 B2 * | 2/2019 | Johnson | | F01D 25/14 |
| 10,450,889 B2 * | 10/2019 | Yates | | F04D 27/009 |
| 10,767,562 B2 * | 9/2020 | Liu | | F02C 7/143 |
| 2003/0150214 A1 * | 8/2003 | Lair | | F02C 9/18 60/771 |
| 2007/0084216 A1 | 4/2007 | Mazeaud et al. | | |
| 2008/0053105 A1 * | 3/2008 | Appleby | | F02C 9/18 60/785 |
| 2010/0215480 A1 * | 8/2010 | Leach | | F02C 9/18 415/145 |
| 2010/0236256 A1 * | 9/2010 | Hussain | | F02K 3/06 60/785 |
| 2011/0011477 A1 * | 1/2011 | Mullender | | F01D 17/105 137/896 |
| 2011/0056210 A1 * | 3/2011 | Griffin | | F04D 27/0223 60/773 |
| 2011/0142602 A1 * | 6/2011 | Adhami | | F02C 9/20 415/159 |
| 2011/0146297 A1 * | 6/2011 | Er | | F01D 17/105 60/785 |
| 2011/0182716 A1 * | 7/2011 | Bouru | | F04D 29/563 415/148 |
| 2011/0229310 A1 * | 9/2011 | Colotte | | F02C 9/22 415/149.4 |
| 2012/0023962 A1 * | 2/2012 | Wichmann | | F02C 6/06 60/773 |
| 2012/0067061 A1 * | 3/2012 | Wright | | F02C 9/18 60/785 |
| 2013/0192239 A1 | 8/2013 | Glahn et al. | | |
| 2013/0192250 A1 * | 8/2013 | Glahn | | F02C 7/28 60/782 |
| 2013/0269366 A1 * | 10/2013 | Haugen | | F02K 3/075 60/783 |
| 2014/0013765 A1 * | 1/2014 | Studerus | | F04D 27/0207 60/779 |
| 2014/0109589 A1 * | 4/2014 | Pritchard, Jr. | | F02K 3/075 60/779 |
| 2016/0123237 A1 | 5/2016 | Spagnoletti | | |
| 2016/0169029 A1 | 6/2016 | Schwarz et al. | | |
| 2016/0169109 A1 * | 6/2016 | Liu | | F04D 29/522 60/782 |
| 2016/0265442 A1 * | 9/2016 | Beecroft | | F01D 17/105 |
| 2016/0273450 A1 * | 9/2016 | Marocchini | | F02C 6/08 |
| 2017/0175640 A1 | 6/2017 | Glessner et al. | | |
| 2017/0284303 A1 * | 10/2017 | Johnson | | F02C 9/18 |
| 2017/0328278 A1 | 11/2017 | Hussain et al. | | |
| 2017/0356469 A1 * | 12/2017 | Yates | | F02C 7/2365 |
| 2018/0134407 A1 | 5/2018 | Elbibary et al. | | |
| 2018/0171875 A1 | 6/2018 | Okui et al. | | |

FOREIGN PATENT DOCUMENTS

| | | |
|---|---|---|
| EP | 2 492 199 A2 | 8/2012 |
| EP | 3 032 031 A1 | 6/2016 |
| EP | 3 184 781 A1 | 6/2017 |
| JP | 2003-148167 A | 5/2003 |
| WO | 2018/012100 A1 | 1/2018 |

OTHER PUBLICATIONS

Nov. 13, 2018 Search Report issued in British Patent Application No. 1808852.6.

U.S. Appl. No. 16/401,220, filed May 2, 2019 in the name of Peace et al.

Oct. 14, 2019 Search Report issued in European Patent Application No. 19172088.7.

Oct. 30, 2019 extended European Search Report issued in European Patent Application No. 19172089.5.

* cited by examiner

GAS TURBINE ENGINE WITH COMPRESSOR BLEED VALVE INCLUDING AT LEAST TWO OPEN POSITIONS

The present disclosure relates to gas turbine engines, in particular gas turbine engines comprising a compressor bleed valve for releasing bleed air from a compressor.

BACKGROUND

Gas turbine engines may include compressor bleed valves to release pressure from compressor stages within the gas turbine engine core. In particular, valves are used to control the compressor of the gas turbine engine so that it operates at the optimum working line. In some known arrangements, three poppet valves, which can be controlled to be on or off, are provided on one of the compressor stages, and a further single poppet valve is provided on a higher stage of the compressor. Specifically, the valve on the higher stage is used to control the working line of the compressor during starting of the engine, and the three valves on the lower stage of the engine are used to control the working line of the compressor during normal operation of the engine. The three valves on the lower stage of the compressor can be individually controlled so that they may be all closed, or one, two, or three valves are open. By varying the number of valves that are open, the working line of the compressor can be controlled.

All of the above valves typically exhaust the bleed air from the compressor (which is part of the engine core) through respective bleed ducts into the bypass duct of the engine (which is located radially outward of the engine core). Such arrangements require multiple bleed ducts to be provided between the engine core and the bypass duct, which requires multiple apertures to be provided between the engine core and bypass duct, requires other components to support the duct, and takes up space in the area between the engine core and bypass duct. Further, the exhaust of the compressor bleed air into the bypass duct creates a shear effect between the bleed air and the bypass flow when it is ejected, which creates noise, as well as resulting in high pressure jets impacting the structure of the bypass duct.

It is an aim of the present disclosure to at least partially address the problems with gas turbine engines discussed above.

Summary of Disclosure

According to a first aspect of the present disclosure, there is provided a gas turbine engine comprising a compressor, a turbine, and a first compressor bleed valve in fluid communication with the compressor and configured to release bleed air from the compressor, wherein the first compressor bleed valve is configured to release bleed air to a downstream location in the engine, the downstream location being downstream of the turbine, wherein the first compressor bleed valve is configured to open to at least two positions, to thereby release a variable amount of bleed air from the compressor.

In an arrangement, the engine may comprise a second compressor bleed valve in fluid communication with the compressor and configured to release bleed air from the compressor. The second compressor bleed valve may be located downstream of the first compressor bleed valve.

In an arrangement, the compressor may be a multi-stage compressor. The second compressor bleed valve may be located at a higher stage of the compressor than the first compressor bleed valve.

In an arrangement, the bleed air from the first compressor bleed valve may be directed to the downstream location by a first bleed duct.

In an arrangement, the downstream location may be a tail bearing housing.

In an arrangement, the engine may comprise a bypass duct configured to carry a bypass airflow. The second compressor bleed valve may be configured to release bleed air into the bypass airflow through a second bleed duct.

In an arrangement, a portion of the first bleed duct may pass through the second bleed duct. The first and second bleed ducts may not be in fluid communication with each other.

In an arrangement, the bypass duct may comprise a deflector configured to deflect bleed air from the second compressor bleed valve in order to promote mixing of the bleed air with the air in the bypass duct.

In an arrangement, the turbine may be a low pressure turbine. The engine may further comprise a high pressure turbine.

In an arrangement, at least one of the valves may comprise a multi-position bellcrank and a flapper. The bellcrank may be configured to control the position of the flapper to control the opening amount of the at least one valve.

In an arrangement, the first compressor bleed valve may be configured to move to an opening amount which is continuously variable between fully open and fully closed.

In an arrangement, the opening amount of at least one of the valves may be controlled by a difference in pressure of a control fluid across a control component separate from the at least one valve and mechanically coupled to the at least one valve. The difference in pressure across the control component may be controlled by r petered flow of a control fluid from a hydromechanical device.

In an arrangement, the opening amount of at least one of the valves may be controlled by a difference in pressure of a control fluid across a control component mounted to the at least one valve, the control fluid being supplied from a central source of pressurised control fluid. The difference in pressure may be controlled by a hydromechanical device.

In an arrangement, the control fluid may be a hydraulic fluid or fuel.

In an arrangement, the engine may comprise a first turbine, a second turbine, a first compressor and a second compressor. The compressor with which the first compressor bleed valve is in fluid communication may be the second compressor. The turbine downstream of which the downstream location is located may be the first turbine.

In an arrangement, the engine may comprise a core shaft connecting the first turbine to the first compressor. The first turbine, first compressor, second turbine, second compressor and core shaft may be comprised in an engine core. The engine may further comprise a fan located upstream of the engine core. The fan may comprisine a plurality of fan blades. The engine may further comprise a gearbox that receives an input from the core shaft and outputs drive to the fan so as to drive the fan at a lower rotational speed than the core shaft.

In an arrangement, the core shaft may be a first core shaft. The engine may comprise a second core shaft connecting the second turbine to the second compressor. The second turbine, second compressor, and second core shaft may be arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTC) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding; such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000m to 15000m, for example in the range of from 10000m to 12000m, for example in the range of from 10400m to 11600m (around 38000 ft), for example in the range of from 10500m to 11500m, for example in the range of from 10600m to 11400m, for example in the range of from 10700m (around 35000 ft) to 11300m, for example in the range of from 10800m to 11200m, for example in the range of from 10900m to 11100m, for example on the order of 11000m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

DETAILED DESCRIPTION

Figure 1:
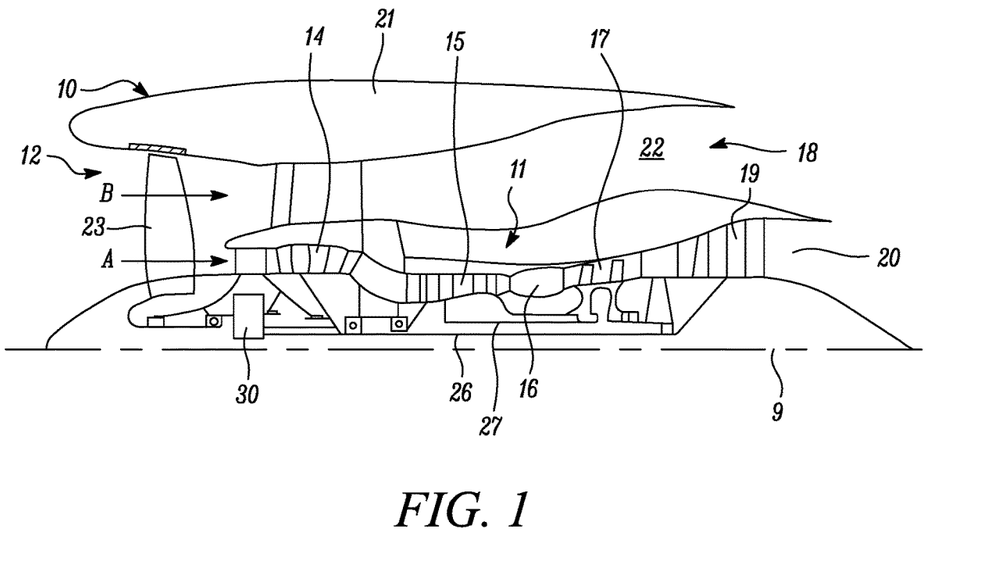
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20, A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
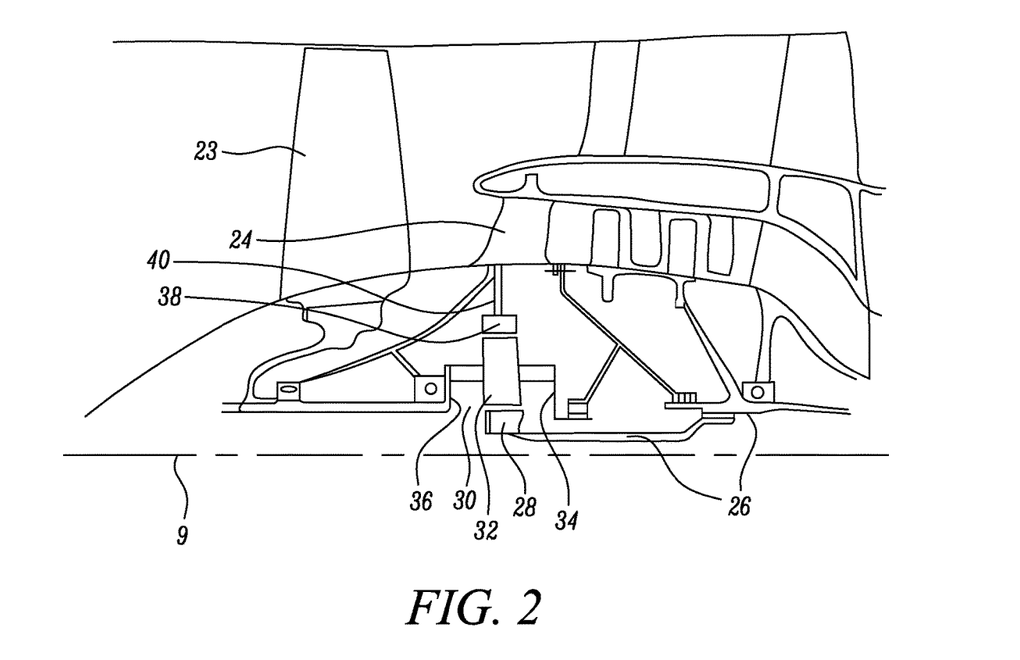
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
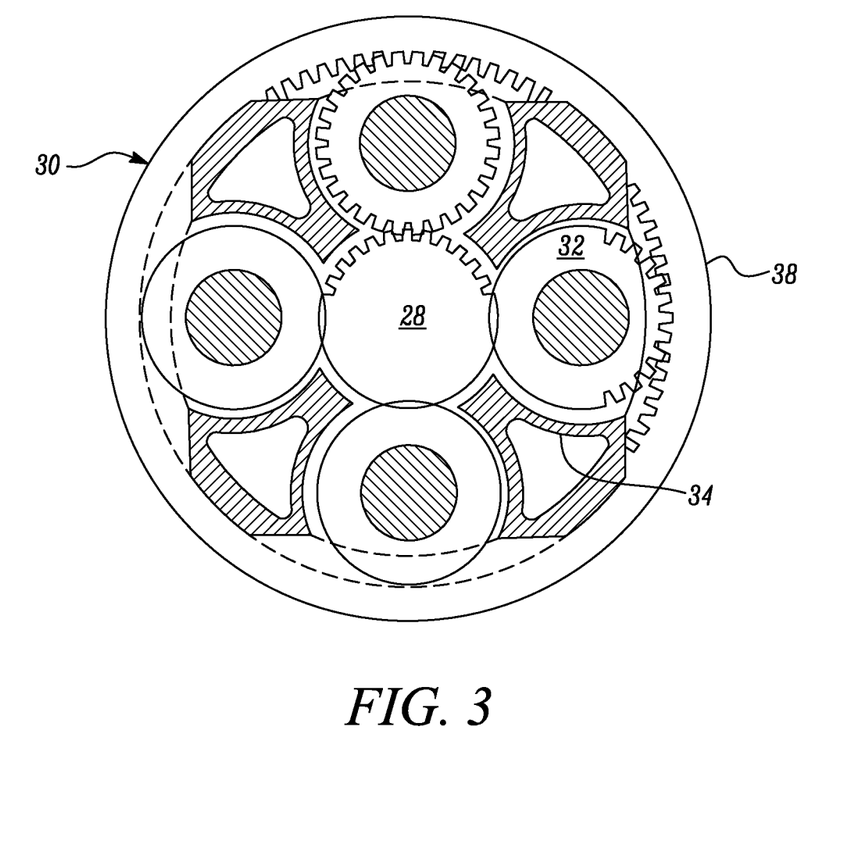
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The gas turbine engine as disclosed herein comprises a compressor 15, a turbine 19, and a first compressor bleed valve 43. The first compressor bleed valve 43 is in fluid communication with the compressor 15, and is configured to release bleed air from the compressor 15. The first compressor bleed valve 43 is configured to release bleed air to a downstream location 44 in the engine, the downstream location 44 being located downstream of the turbine 19. The first compressor bleed valve 43 is also configured to open to at least two positions (or at least two opening amounts), to release a variable amount of bleed air from the compressor. That is, the valve can control the amount of bleed air being released from the compressor by changing the amount that the valve is open. Of course, the valve can also be closed as well as being in the at least two open positions.

In the arrangement described above, the bleed air from the compressor 15 is ejected to a location in the engine downstream of the turbine, rather than being ejected into the bypass duct, as in the known arrangements described above. The bleed valve being configured to open to at least two positions means that the amount of air being bled from the compressor can be controlled using a single bleed valve rather than a plurality of bleed valves, which are either open or closed, as in the known arrangements described above. Further, because the bleed air is directed to a location downstream of the compressor 15, it is not ejected into the bypass flow.

Figure 4:
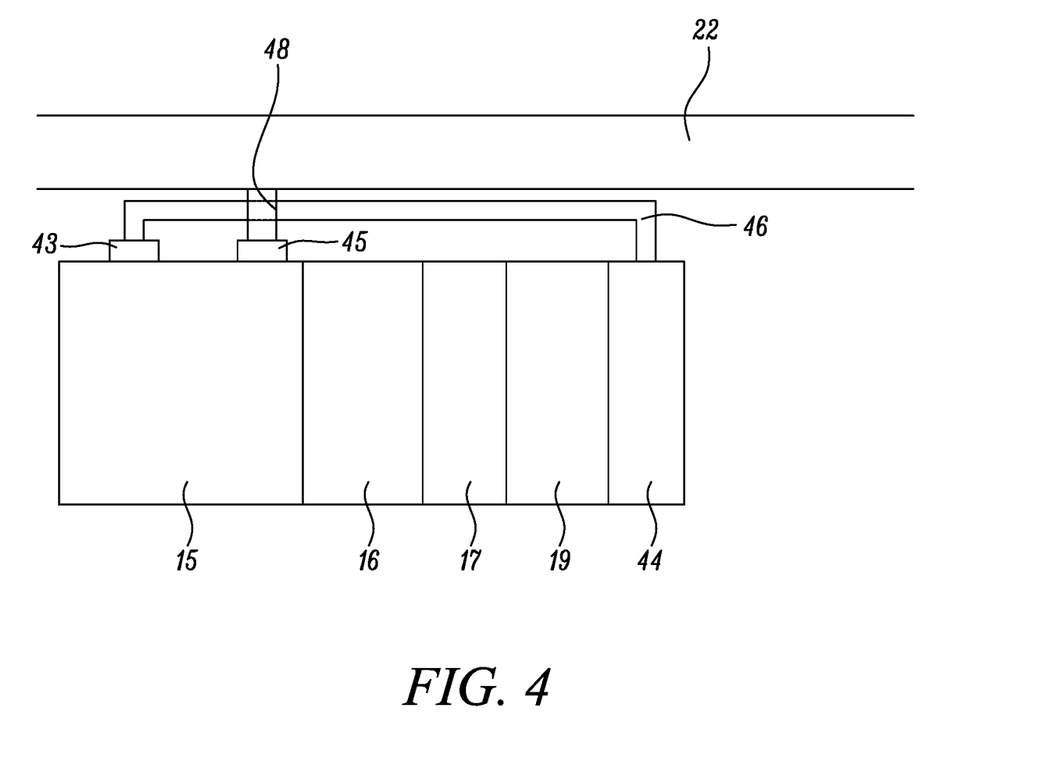
FIG. 4 is a sectional side view of a gas turbine engine comprising a compressor bleed valve according to the present disclosure.
Figure 5:
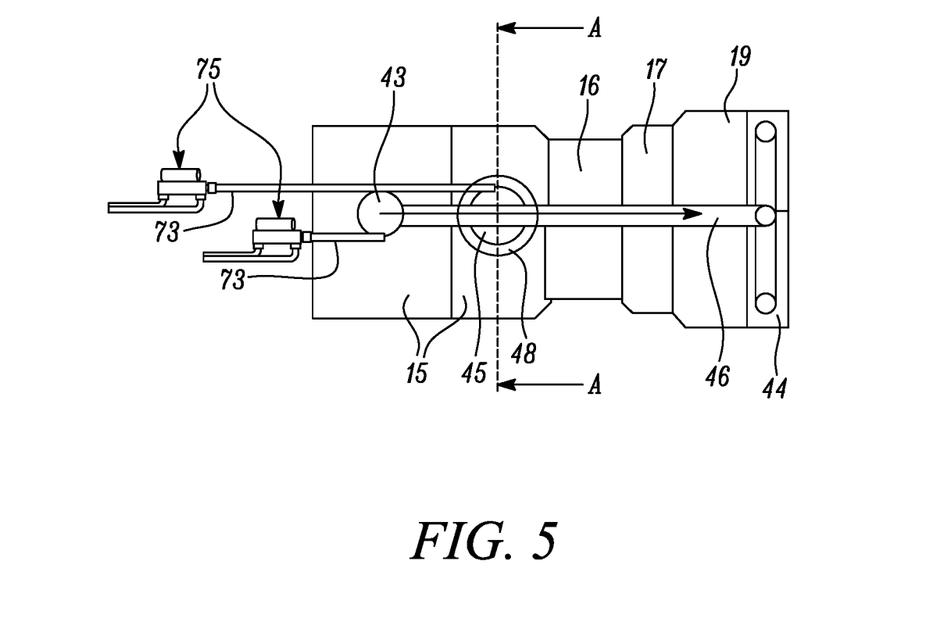
FIG. 5 is a top view of a gas turbine engine comprising a compressor bleed valve according to the present disclosure.

The bleed air from the first compressor bleed valve 43 may be directed to the downstream location by a first bleed duct 46. As shown in FIGS. 4 and 5, the first bleed duct 46 may extend axially along the engine from the first compressor bleed valve 43 until it reaches the tail bearing housing, which is a housing located downstream of the turbine 19. The tail bearing housing surrounds the bearing which supports the turbine 19, and forms part of the external surface of the engine core 11. The tail bearing housing is therefore an example of a downstream location 44 to which bleed air from the first compressor bleed valve is released, or directed. The first bleed duct 46 therefore directs bleed air from the first compressor bleed valve to a location downstream of the turbine.

When the bleed air from the first compressor bleed valve 43 passes through the first bleed duct 46 and reaches the tail bearing housing 44, the duct may split and run around the engine in a circumferential direction, as shown in FIG. 5. The bleed air is then injected through holes in the duct 46 in a radial direction, into the main flow through the engine core 11. Because the main flow already generates a large amount of noise, the additional noise created by the injection of the compressor bleed air may be negligible.

In some arrangements, the first compressor bleed valve 43 can be controlled to be at any position (i.e. any opening amount) between being fully open and fully closed, and can thus continuously vary, or modulate, the amount of bleed air being released from the compressor 15. Alternatively, the first compressor bleed valve 43 may also be configured to open to any number of discrete open positions, thus also controlling the amount of bleed air being released from the compressor.

The gas turbine engine may also further comprise a second compressor bleed valve 45 in fluid communication with the compressor 15, and configured to release bleed air from the compressor. The second compressor bleed valve 45 is located downstream of the first compressor bleed valve 43. When the compressor is a multi-stage compressor, the second compressor bleed valve 45 may be at a higher compression stage of the compressor than the first compressor bleed valve 43. In other words, the second compressor bleed valve 45 may be located downstream of, or aft of, the first compressor bleed valve 43.

The second compressor bleed valve 45 may be configured to exhaust bleed air into the bypass flow, which flows through the bypass duct 22. The bleed air from the second compressor bleed valve 45 may be directed to the bypass duct 22 by a second bleed duct 48. The second bleed duct 48 thus runs between the outside of the compressor where the second compressor bleed valve is located, and the bypass duct 22. In the arrangement shown in FIG. 4, the second bleed duct 48 runs in the radial direction, but the second bleed duct may have any other configuration suitable for directing bleed air from the second compressor bleed valve 45 to the bypass duct 22.

The second compressor bleed valve 45 may typically be used during starting of the engine, when noise is less of a consideration then during normal operation. The second compressor bleed valve 45 may not necessarily used for fine control of the compressor working line. Thus, the second compressor bleed valve 45 may not need to be arranged to open to multiple open positions to release a variable amount of air, and may be controlled to move only between an on or off position. However, the second compressor bleed valve may also be configured to open and close a variable amount to thereby release a variable amount of air, in a similar manner to the first compressor bleed valve 43.

Figure 6:
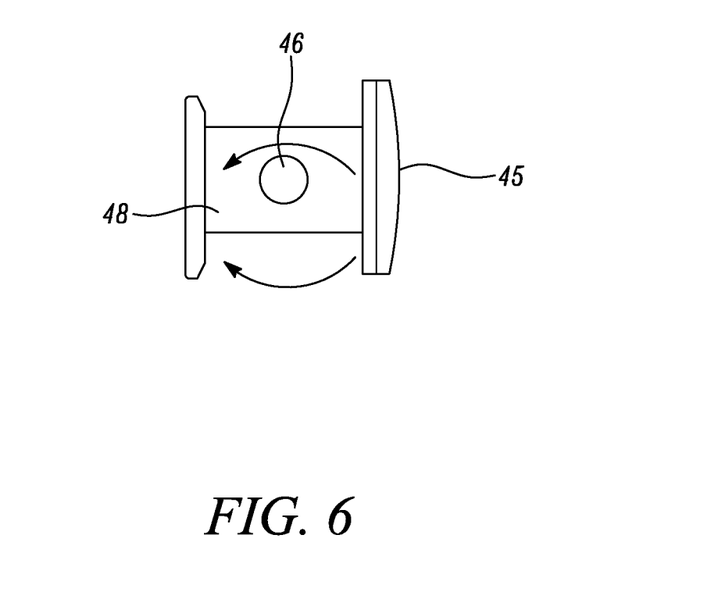
FIG. 6 is a sectional view through line A-A of FIG. 5.

As shown in FIGS. 5 and 6, a portion of the first bleed duct 46 (i.e. a length of the first bleed duct) may be enclosed within the second bleed duct 48, with the first bleed duct passing through the second bleed duct 48. The two ducts are separate channels, and are not in fluid communication with each other. In such an arrangement, the second bleed duct 48 exhausts bleed air from the second compressor bleed valve 45 in a radially outward direction into the bypass duct 22. On the other hand, the first bleed duct 46 extends in an axial direction such that the bleed air from the first compressor bleed valve 43 can be directed to the downstream location 44.

As shown in the cross section of FIG. 6, passes through the second bleed duct n a perpendicular direction to the direction in which the bleed air flows out of the first compressor bleed valve 45 into the bypass duct 22. The first bleed duct and second bleed duct are not in fluid communication with each other. The bleed air from the second compressor bleed valve 45 is at a higher pressure than the bleed air from the first compressor bleed valve 43. Therefore, if the first and second bleed ducts were in fluid communication with each other, bleed air from the second compressor bleed valve could flow back towards the first compressor bleed valve 43, which may adversely affect the operation of the first compressor bleed valve, and affect the control of the working line of the compressor.

The bypass duct may further comprise a deflector (not shown) which is configured to deflect bleed air which has been released from the second compressor bleed valve 45 into the bypass duct 22. The form of the deflector is not limited, but may be designed to promote mixing of the bleed air with the air flowing through the bypass duct 22, or maybe configured to reduce noise caused by the interaction of the air from the second compressor bleed valve 45 with the structure of the bypass duct 22.

It will be appreciated that the arrangements shown in FIGS. 4 and 5 are only exemplary arrangements, and that other arrangements are possible within the scope of the present disclosure. For example, in FIGS. 4 and 5, the first and second compressor bleed valves 44 and 45 are shown at the same circumferential location on the compressor. However, the first and second compressor bleed valves could be located at different circumferential locations on the compressor. In this case, the first bleed duct 46 may be separated circumferentially from the second bleed duct 48, and the first bleed duct may not pass through the second bleed duct.

Likewise, the first bleed duct 46 need not split and run around the engine in a circumferential direction, as shown in FIG. 5. The arrangement of the first bleed duct may be in any form suitable for directing the bleed air from the first compressor bleed valve 43 to the downstream location 44. Thus, the bleed air also need not be injected through holes in the duct 46 in a radial direction at the downstream location. Any suitable arrangement for mixing the bleed air from the first compressor bleed valve with the main core flow may also be used.

Figure 7:
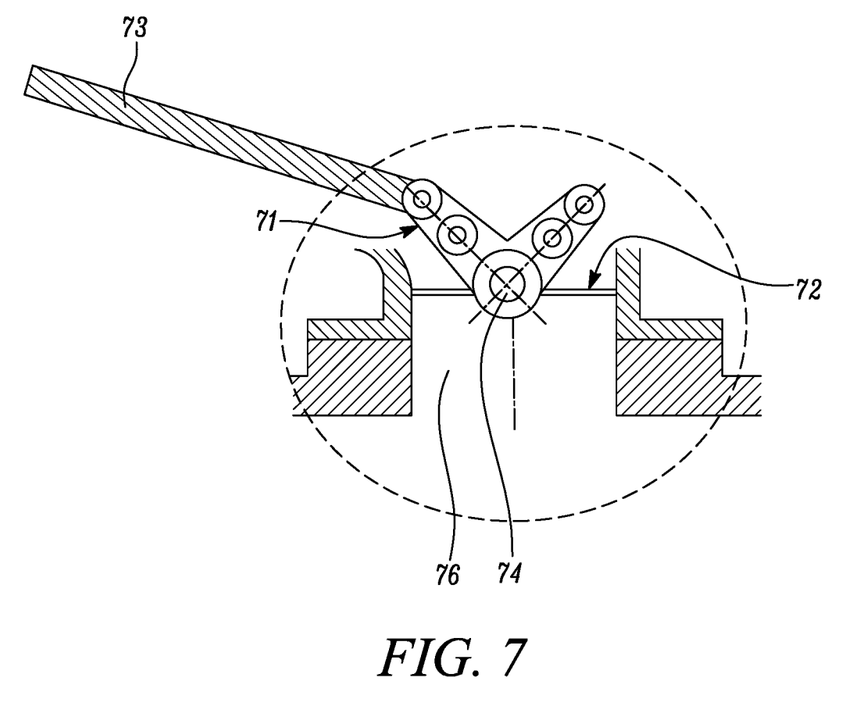
FIG. 7 is a sectional side view of a control mechanism for a valve according to the present disclosure.

As shown in FIG. 7, at least one of compressor bleed valves may comprise a multi-position bellcrank 71 and flapper 72. The bellcrank 71 is configured to rotate around a pivot point 74, and the flapper 72 is attached to the bellcrank such that it rotates when the bellcrank rotates about the pivot point. The flapper 72 is in the form of a plate which, in a certain position, blocks exit of bleed air from the valve by spanning an aperture 76 in the valve, which is in fluid communication with the compressor. FIG. 7 shows the flapper in such a position.

When the bellcrank 71 rotates about the pivot point 74, the flapper also rotates such that it no longer blocks all of the aperture 76. When the bellcrank rotates through a larger angle, a larger gap opens between the flapper and the walls of the aperture 76 in the valve, and thus more bleed air can escape from the valve. Thus, the above mechanism opens and closes the bleed valve by a variable amount, in order to release a variable amount of bleed air from the compressor by appropriate control of the movement of the bellcrank 71.

It will be appreciated that the bellcrank and flapper may be arranged to move between two different open positions and a closed position, may be arranged to move between a larger number of discrete open positions, or may be arranged to move continuously between an open and closed position. It will be appreciated that the above mechanism comprising a bellcrank and a flapper could be used for either or both of the first and second compressor bleed valves.

The bellcrank may be controlled by an actuator 73, which is attached to one end of one of the arms of the bellcrank. The actuator 73 may be attached to a control mechanism, which moves the actuator 73 by a certain amount in order to change the position of the bellcrank 71 and thus control the position of the flapper. In turn, this controls the opening amount of the valve.

The position of the actuator (or of a different mechanism controlling the position of the valve) may be controlled by a difference in pressure of a control fluid across (i.e. on either side of) a control component 75, such as a fluid-draulic actuator. The control component 75 may be connected to one end of the actuator 73, being the opposite end to the end which is connected to the bellcrank 71. The difference in pressure either side of the control component 75 may be controlled by hydro-mechanical device, such as a servo, which is located separately from the valve.

In this arrangement, the difference in pressure on across the control component may cause a variable movement of the actuator 73, which in turn controls the position of the bellcrank 71, and thus the opening amount of the valve. The control component 75 may be located at any suitable position within the engine, and may be dictated by where there is available space.

The above control system may be a hydraulic control system, in which the control fluid is a pressurised hydraulic fluid. Alternatively, the control fluid may be pressurised fuel. The latter arrangement is known as a "fueldraulic" arrangement.

In an alternative arrangement for controlling the opening amount of the valve, pressurised fluid may be obtained from a mains source of pressurised control fluid, which controls other components in the engine. In this case, a separate hydro-mechanical device and actuator may not be required. Rather, the pressurised fluid is supplied to the valve body, and the pressurised fluid is provided on either side of a control component located inside the valve body itself. Then, when the pressure across the control component is varied, a pressure difference is created across the control component, which in turn changes the opening amount of the valve. The pressure across the control component may be controlled by a hydromechanical device, such as a servo, which may be either located inside the valve body, mounted to the valve body or separate from the valve body. In such an arrangement, the control fluid may again be a pressurised hydraulic fluid, or may be pressurised fuel.

It will be appreciated that the bleed valves could also use arrangements other than those described above comprising a bellcrank and flapper, and that other control mechanisms for controlling the opening amount of the valve could be used.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising:
   a compressor;
   a turbine;
   a first compressor bleed valve in fluid communication with the compressor and configured to release bleed air from the compressor;
   a second compressor bleed valve in fluid communication with the compressor and configured to release bleed air from the compressor;
   a bypass duct configured to carry a bypass airflow;
   a first bleed duct; and
   a second bleed duct; wherein
   the first compressor bleed valve is configured to release bleed air to a downstream location in the engine through the first bleed duct, the downstream location being downstream of the turbine;
   the first compressor bleed valve is configured to open to at least two positions, to thereby release a variable amount of bleed air from the compressor, and configured to close;
   the second compressor bleed valve is located downstream of the first compressor bleed valve; and
   the second compressor bleed valve is configured to release bleed air into the bypass airflow through the second bleed duct.

2. The gas turbine engine according to claim 1, wherein:
   the compressor is a multi-stage compressor; and
   the second compressor bleed valve is located at a higher stage of the compressor than the first compressor bleed valve.

3. The gas turbine engine according to claim 1, wherein a portion of the first bleed duct passes through the second bleed duct, and the first and second bleed ducts are not in fluid communication with each other.

4. The gas turbine engine according to claim 1 wherein the bypass duct comprises a deflector configured to deflect bleed air from the second compressor bleed valve in order to promote mixing of the bleed air with the air in the bypass duct.

5. The gas turbine engine according to claim 1, wherein the downstream location is a tail bearing housing.

6. The gas turbine engine according to claim 1, wherein the turbine is a low pressure turbine,
   wherein the engine further comprises a high pressure turbine.

7. The gas turbine engine according to claim 1, wherein:
   the first compressor bleed valve comprises a multi-position bellcrank and a flapper; and
   the bellcrank is configured to control the position of the flapper to control the opening amount of the first compressor bleed valve.

8. The gas turbine engine according to claim 7, wherein the position of the multi-position bellcrank is controlled by an actuator.

9. The gas turbine engine according to claim 1, wherein the first compressor bleed valve is configured to move to an opening amount which is continuously variable between fully open and fully closed.

10. The gas turbine engine according to claim 1, wherein:
    the opening amount of the first compressor bleed valve is controlled by a difference in pressure of a control fluid across a control component separate from the first compressor bleed valve and mechanically coupled to the first compressor bleed valve; and
    the difference in pressure across the control component is controlled by metered flow of a control fluid from a hydromechanical device.

11. The gas turbine engine according to claim 10, wherein the control fluid is a hydraulic fluid.

12. The gas turbine engine according to claim 10, wherein the control fluid is fuel.

13. The gas turbine engine according to claim 1, wherein:
    the opening amount of the first compressor bleed valve is controlled by a difference in pressure of a control fluid across a control component mounted to the first compressor bleed valve, the control fluid being supplied from a central source of pressurised control fluid; and
    the difference in pressure is controlled by a hydromechanical device.

14. The gas turbine engine according to claim 1, wherein the engine comprises:
    a high pressure turbine;
    a low pressure turbine;
    a low pressure compressor; and
    a high pressure compressor;
    wherein the compressor with which the first compressor bleed valve is in fluid communication is the high pressure compressor; and
    the turbine downstream of which the downstream location is located is the high pressure turbine.

15. The gas turbine engine according to claim 14, further comprising a core shaft connecting the low pressure turbine to the low pressure compressor;
    wherein the high pressure turbine, low pressure compressor, low pressure turbine, high pressure compressor and core shaft are comprised in an engine core;
    wherein the engine further comprises:
    a fan located upstream of the engine core, the fan comprising a plurality of fan blades; and
    a gearbox that receives an input from the core shaft and outputs drive to the fan so as to drive the fan at a lower rotational speed than the core shaft.

16. The gas turbine engine according to claim 15, wherein:
    the core shaft is a first core shaft;
    the engine comprises a second core shaft connecting the high pressure turbine to the high pressure compressor; and
    the high pressure turbine, high pressure compressor, and second core shaft are arranged to rotate at a higher rotational speed than the first core shaft.

* * * * *